United States Patent [19]

Oya

[11] Patent Number: 5,665,887
[45] Date of Patent: Sep. 9, 1997

[54] METHINE COMPOUND

[75] Inventor: Toyohisa Oya, Kanagawa, Japan

[73] Assignee: Fuji Photo Film Co., Ltd., Kanagawa, Japan

[21] Appl. No.: 695,378

[22] Filed: Aug. 9, 1996

[30] Foreign Application Priority Data

Aug. 10, 1995 [JP] Japan .................................. 7-204281

[51] Int. Cl.$^6$ .................................................. C07D 277/20
[52] U.S. Cl. .......................... 548/178; 548/150; 548/183; 548/180
[58] Field of Search .................................. 548/183, 180, 548/150, 178

[56] References Cited

U.S. PATENT DOCUMENTS

| | | | |
|---|---|---|---|
| 4,147,542 | 4/1979 | Habu et al. | 96/27 |
| 4,729,946 | 3/1988 | Kasama et al. | 430/567 |
| 5,229,262 | 7/1993 | Aria et al. | 430/583 |

FOREIGN PATENT DOCUMENTS 54-34331  10/1979  Japan .

Primary Examiner—Joseph McKane
Assistant Examiner—Richard S. Myers, Jr.
Attorney, Agent, or Firm—Birch, Stewart, Kolasch & Birch, LLP

[57] ABSTRACT

A novel methine compound is disclosed, which contains a rhodanine ring substituted with a linear or branched alkyl, alkenyl, or alkynyl group containing at least one carboxyl group and at least one ester bond, amide bond, or ether bond. The methine compound has excellent stability and dyeing power.

3 Claims, No Drawings

METHINE COMPOUND

FIELD OF THE INVENTION

The present invention relates to a novel methine compound. More particularly, this invention relates to a novel methine compound suitable for use as a dye for filters, a dye for pulp dyeing, a dye for photographic photosensitive materials, a spectral sensitizing dye for photography, a medicine, etc.

BACKGROUND OF THE INVENTION

In the field of light-absorbing filters, the technique of incorporating a dye into a constituent layer for the purpose of absorbing a light having a specific wavelength has generally been employed extensively. Further, dyeing with dyes each having a specific absorption spectrum is being extensively conducted for the purpose of producing pulp products having various color tones. The dyes used for such purposes should not only have spectral characteristics suitable for the intended use, but also satisfy requirements, e.g., to have a high absorbance index, to have excellent stability with freedom from a concentration change or discoloration with the lapse of time in dyed products or in dye solutions, and not to be discolored or faded by the influence of other additives. Moreover, the dyes for use in producing these products preferably are dyes which have sufficient solubility in solvents therefor and do not cause decoloring after dyeing.

Many investigations have been made so far in order to satisfy the requirements described above. For example, a merocyanine dye was proposed in U.S. Pat. No. 3,615,608, benzylidene dyes were proposed in U.S. Pat. Nos. 3,540,887 and 3,544,325 and JP-B-31-10578 (the term "JP-B" as used herein means an "examined Japanese patent publication"), a styryl dye was proposed in U.S. Pat. No. 1,845,404, an oxonol dye was proposed in British Patent 506,385, and a hemioxonol dye was proposed in U.S. Pat. No. 3,652,289. Although some of these dyes have an appropriate absorption spectrum, the others are known to have a drawback that they undergo considerable fading or an undesirable change in absorption spectrum due to the influence of the product pH or of other additives. In addition, many of those proposed dyes either have low solubility and hence hardly give a dye solution having a concentration necessary for giving an absorption intensity required of a product, or have insufficient dyeing power even though having high solubility. Thus, few dyes satisfy all of the requirements described above.

A merocyanine dye having both a benzothiazole ring and a rhodanine ring as terminal auxochromes is disclosed in, e.g., JP-B-54-34331. However, there has been no known merocyanine dye which has a rhodanine ring substituted with a carboxyalkyl group containing an ester, amide, or ether bond within the substituent.

SUMMARY OF THE INVENTION

An object of the present invention is to provide a novel methine compound which is stable and has high dyeing power.

As a result of intensive investigations, the object of the present invention has been accomplished with the methine compounds specified below.

(1) A methine compound represented by general formula (I):

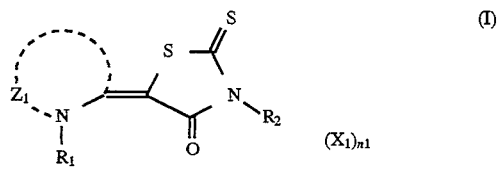

wherein $Z_1$ represents a group of nonmetal atoms necessary for completing a five- or six-membered nitrogen-containing heterocycle; $R_1$ represents an unsubstituted or substituted alkyl group; $R_2$ represents a linear or branched alkyl, alkenyl, or alkynyl group containing at least one carboxyl group and at least one ester bond, amide bond, or ether bond; $X_1$ represents a counter ion necessary for charge neutralization; and $n_1$ represents a number of 0 or larger necessary for intramolecular charge neutralization.

(2) The methine compound as described in (1) above, wherein $Z_1$ represents a group of nonmetal atoms necessary for completing an optionally substituted thiazole, benzothiazole, or naphthothiazole ring.

(3) The methine compound as described in (1) above, wherein $Z_1$ represents a group of nonmetal atoms necessary for completing an optionally substituted benzothiazole ring.

DETAILED DESCRIPTION OF THE INVENTION

The compound represented by general formula (I) according to the present invention is explained below in detail.

The five- or six-membered nitrogen-containing ring completed with $Z_1$ may be a part of a fused ring, and may be saturated or unsaturated. It may contain an oxygen, sulfur, selenium, or tellurium atom as a heteroatom besides the nitrogen atom(s). Desirable examples thereof include a benzothiazole nucleus, benzoxazole nucleus, benzoselenazole nucleus, benzotellurazole nucleus, 2-quinoline nucleus, 4-quinoline nucleus, isoquinoline nucleus, pyridine nucleus, indolenine nucleus, benzimidazole nucleus, naphthothiazole nucleus, naphthoxazole nucleus, naphthoselenazole nucleus, naphthotellurazole nucleus, naphthoimidazole nucleus, oxazole nucleus, thiazoline nucleus, selenazoline nucleus, indoline nucleus, oxazoline nucleus, oxadiazole nucleus, thiadiazole nucleus, tetrazole nucleus, thiazole nucleus, selenazole nucleus, imidazole nucleus, imidazo[4,5-b]quinoxaline nucleus, and pyrimidine nucleus. Preferred of these are an oxazole nucleus, benzothiazole nucleus, naphtho[1,2-d]thiazole nucleus, naphtho[2,1-d]thiazole nucleus, naphtho[2,3-d]thiazole nucleus, thiazole nucleus, and thiazoline nucleus, with a benzothiazole nucleus being especially preferred. These nitrogen-containing heterocyclic groups may have a substituent. Examples of the substituent include halogen atoms (e.g. fluorine, chlorine, and bromine), unsubstituted alkyl groups having 1 to 12, desirably 1 to 6, carbon atoms (e.g., methyl, ethyl, n-propyl, isopropyl, n-butyl, and n-hexyl), alkoxy groups having 1 to 6, desirably 1 to 4, carbon atoms (e.g., methoxy, ethoxy, propoxy, and isopropoxy), hydroxy, alkoxycarbonyl groups having 2 to 12, desirably 2 to 5, carbon atoms (e.g., methoxycarbonyl and ethoxycarbonyl), alkylcarbonyloxy groups having 2 to 10, desirably 2 to 5, carbon atoms (e.g., acetyloxy and propionyloxy), phenyl, hydroxyphenyl, groups having both an amide group and an aromatic ring and having 3 to 15, desirably 5 to 10, carbon atoms (e.g., p-acetylaminophenyl, m-acetylaminophenyl, 2-pyrrolecarboxamido, m-hydroxybenzamido, 2,6-dihydroxybenzamido, 2-furancarboxamido, and 2-thiophenecarboxamido), furyl, and pyrrolyl. Preferred of these are unsubstituted alkyl groups having 1 to 3 carbon atoms (e.g., methyl, ethyl, n-propyl, and isopropyl) and alkoxy groups having 1 to 3 carbon atoms (e.g., methoxy, ethoxy, propoxy, and isopropoxy), with methyl, methoxy, and ethoxy being especially preferred.

$R_1$ represents an unsubstituted or substituted alkyl group having 1 to 12, desirably 1 to 8, carbon atoms. Examples of substituents include hydroxy, sulfo, sulfato, carboxy, halogen atoms (e.g., fluorine, chlorine, and bromine), unsubstituted or substituted alkoxy groups having 1 to 6, desirably 1 to 4, carbon atoms (the alkoxy groups may be substituted with a sulfo or hydroxy group), alkoxycarbonyl groups having 2 to 5, desirably 2 to 3, carbon atoms, alkylsulfonyl groups having 1 to 4 carbon atoms, sulfamoyl, unsubstituted or substituted carbamoyl groups (including carbamoyl groups substituted with an alkyl group having 1 to 4 carbon atoms), substituted phenyl groups (preferred substituents include sulfo, carboxy, and hydroxy), and vinyl. Desirable examples of the unsubstituted alkyl groups include methyl, ethyl, propyl, and butyl, with ethyl being preferred. Desirable examples of the substituted alkyl groups include hydroxyalkyl groups such as hydroxyethyl and 3-hydroxypropyl, sulfoalkyl groups such as 2-sulfoethyl, 3-sulfopropyl, 3-sulfobutyl, 4-sulfobutyl, and 2-hydroxy-3-sulfopropyl, 2-sulfatoethyl, 3-sulfatopropyl, carboxyalkyl groups such as carboxymethyl, carboxyethyl, and carboxypropyl, trifluoromethyl, 2,2,2-trifluoroethyl, 2-(3-sulfopropoxy) ethyl, 2-(2-hydroxyethoxy)ethyl, ethoxycarbonylethyl, methylsulfonylethyl, sulfamoylalkyl groups such as 2-sulfamoylethyl, 2-carbamoylethyl, 2-N,N-dimethylcarbamoylethyl, phenethyl, p-carboxyphenethyl, o-sulfophenethyl, p-hydroxyphenethyl, allyl, and phenoxyethyl. Particularly preferred of these substituted alkyl groups are 2-sulfoethyl, 3-sulfopropyl, 3-sulfobutyl, and 4-sulfobutyl.

$R_2$ represents a linear or branched alkyl, alkenyl, or alkynyl group containing at least one carboxyl group and at least one ester bond, amide bond, or ether bond and having 2 to 30, desirably 4 to 20, carbon atoms. In the case where $R_2$ has a substituent containing an ester bond or an amide bond therein, either of the oxo oxygen atom or nitrogen atom contained in the ester or amide bond and the carbonyl carbon may be located closer to the rhodanine ring, but the carbonyl group is preferably located closer to the rhodanine ring. These substituents may contain two or more of an ether bond, an amide bond, and an ester bond in combination. Examples of the substituents include carboxyalkoxycarbonylmethyl groups (e.g., carboxymethoxycarbonylmethyl, 2-((2-carboxyethoxy)carbonyl)ethyl, (2-carboxyethoxy) carbonylmethyl, (2-carboxy-1-methylethoxy) carbonylmethyl, and (3-carboxypropyloxycarbonylmethyl), carboxyalkylcarbonyloxyalkyl groups (e.g., (2-carboxyethyl)carbonyloxymethyl, 2-((2-carboxyethyl) carbonyloxy)ethyl, ethyl, (3-carboxypropyl) carbonyloxymethyl, and (4-carboxybutyl) carbonyloxyethyl), carbonylalkoxyalkylcarbonyloxyalkyl groups (e.g., carbonylmethoxymethylcarbonyloxymethyl), 2-(Z)-carbonylvinylcarbonyloxymethyl, carbonylcarboxyalkyl groups (e.g., 2-(2-carbonylethoxy)ethyl and 2-(2-(2-carbonylethylcarbonyloxy)ethoxy)ethyl), carboxyalkylcarboxyaminoalkyl groups (e.g., N-(3-carboxyethylcarboxy) aminomethyl and 2-(N-(3-carboxyethylcarboxy) amino) ethyl), carboxyalkylcarbamoylalkyl groups (e.g., 2-((2-carboxyethyl)carbamoyl)ethyl), and N-(carbonylethoxyethylcarbonyl)aminomethyl. Desirable of these substituents are carboxyalkoxycarbonylmethyl groups and carboxyalkylcarbonyloxyalkyl groups. Preferred of these are carboxyethoxycarbonylmethyl, 2-((2-carboxyethoxy)carbonyl)ethyl, (2-carboxy-1-methylethoxy) carbonylmethyl, and (3-carboxypropyloxy) carbonylmethyl.

$X_1$ contained in the formula shows the presence or absence of a cation or anion which is necessary as a counter ion for neutralizing the ionic charge within the compound molecule. Whether a compound is a cation or an anion or is a compound having virtually no ionic charge depends on its molecular structure and substituent(s).

Representative examples of the cation as a counter ion include inorganic or organic ammonium ions (e.g., a triethylammonium ion and pyridinium ion), alkali metal ions (e.g., a sodium ion and potassium ion), and alkaline earth metal ions (e.g., a calcium ion and magnesium ion). Representative examples of the anion as a counter ion include halide ions (e.g., a fluoride ion, chloride ion, bromide ion, and iodide ion), arylsulfonate ions (e.g., a p-toluenesulfonate ion and p-chlorobenzenesulfonate ion), alkylsulfonate ions (e.g., a methanesulfonate ion), aryldisulfonate ions (e.g., a 1,3-benzenedisulfonate ion, 1,5-naphthalenedisulfonate ion, and 2,6-naphthalenedisulfonate ion), alkylsulfate ions (e.g., a methylsulfate ion and ethylsulfate ion), a sulfate ion, a thiocyanate ion, a perchlorate ion, a tetrafluoroborate ion, a pyrophosphate ion, an acetate ion, a trifluoromethanesulfonate ion, and a hexafluorophosphate ion. The counter ion may be an ionic polymer, or another organic compound having the opposite charge, or a metal complex ion (e.g., a bis(1,2-benzenedithiolato)nickel(III) ion).

Desirable examples of $X_1$ are a sodium ion, potassium ion, triethylammonium ion, pyridinium ion, iodide ion, bromide ion, chloride ion, methanesulfonate ion, and p-toluenesulfonate ion. Preferred of these are a sodium ion, potassium ion, and triethylammonium ion.

A preferred combination of the heterocyclic ring completed with $Z_1$ and the substituents $R_1$ and $R_2$ is such that $Z_1$ is a 5-methylbenzothiazole nucleus or 5-methoxybenzothiazole nucleus, $R_1$ is a sulfoalkyl group (e.g., 2-sulfoethyl, 3-sulfopropyl, 3-sulfobutyl, or 4-sulfobutyl), and $R_2$ is a carboxyalkoxycarbonylalkyl group (e.g., (2-carboxyethoxy)carbonylmethyl or (2-carboxy-1-methylethoxy) carbonylmethyl) or a carboxyalkylcarbonyloxyalkyl group (e.g., (3-carboxypropioxy) carbonylmethyl).

Specific examples of the methine compound represented by general formula (I) of the present invention are shown below, but these examples should not be construed as limiting the scope of the invention.

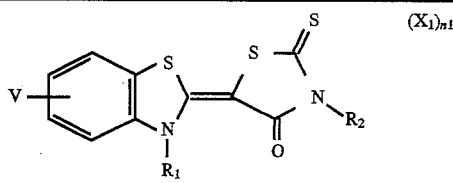

| Compound No. | V | $R_1$ | $R_2$ | $(X_1)_{n1}$ |
|---|---|---|---|---|
| I-1 | 5-MeO | $(CH_2)_4SO_3^-$ | $(CH_2)_2OC=O(CH_2)_2CO_2H$ | $N^+HEt_3$ |
| I-2 | H | $(CH_2)_4SO_3^-$ | $(CH_2)_2OC=O(CH_2)_2CO_2H$ | $N^+HEt_3$ |
| I-3 | 5-MeO | $(CH_2)_2CH(CH_3)SO_3^-$ | $(CH_2)_2OC=O(CH_2)_2CO_2^-$ | $2K^+$ |
| I-4 | 5-Me | $(CH_2)_4SO_3^-$ | $(CH_2)_2OC=O(CH_2)_2CO_2H$ | $N^+HEt_3$ |
| I-5 | 5-MeO | $(CH_2)_3SO_3^-$ | $(CH_2)_2OC=O(CH_2)_2CO_2^-$ | $2K^+$ |
| I-6 | 5-Me | $(CH_2)_3SO_3^-$ | $(CH_2)_2OC=O(CH_2)_2CO_2^-$ | $2K^+$ |
| I-7 | 5-MeO | $(CH_2)_4SO_3^-$ | $(CH_2)_2OC=OCH_2OCH_2CO_2^-$ | $2K^+$ |
| I-8 | H | $(CH_2)_4SO_3^-$ | $(CH_2)_2OC=OCH_2OCH_2CO_2^-$ | $2K^+$ |
| I-9 | 5-MeO | $(CH_2)_4SO_3^-$ | $CH_2C=OO(CH_2)_3CO_2^-$ | $2Na^+$ |
| I-10 | 5-MeO | $(CH_2)_3SO_3^-$ | $CH_2C=OO(CH_2)_3CO_2^-$ | $2K^+$ |
| I-11 | 5-MeO | $(CH_2)_4SO_3^-$ | $CH_2C=OOCH(CH_3)CO_2^-$ | $2K^+$ |
| I-12 | 5-MeO | $(CH_2)_4SO_3^-$ | $(CH_2)_2OC=OCH=CHCO_2^-$ | $2K^+$ |
| I-13 | 5-Me | $(CH_2)_4SO_3^-$ | $(CH_2)_2OC=OCH=CHCO_2^-$ | $2K^+$ |
| I-14 | 5-MeO | $(CH_2)_4SO_3^-$ | $(CH_2)_2O(CH_2)_2OC=O(CH_2)_2CO_2^-$ | $2K^+$ |
| I-15 | 5-MeO | $(CH_2)_2CH(CH_3)SO_3^-$ | $(CH_2)_2O(CH_2)_2OC=O(CH_2)_2CO_2^-$ | $2K^+$ |
| I-16 | H | $(CH_2)_4SO_3^-$ | $(CH_2)_2O(CH_2)_2CO_2^-$ | $2K^+$ |
| I-17 | 5-MeO | $(CH_2)_4SO_3^-$ | $(CH_2)_2O(CH_2)_2CO_2H$ | $N^+HEt_3$ |
| I-18 | 5-MeO | $(CH_2)_4SO_3^-$ | $CH_2C=ONHCH_2CO_2^-$ | $2K^+$ |
| I-19 | 5-MeO | $(CH_2)_4SO_3^-$ | $(CH_2)_2NHC=O(CH_2)_2CO_2H$ | $N^+HEt_3$ |
| I-20 | 5-MeO | $(CH_2)_4SO_3^-$ | $(CH_2)_2NHC=ONH(CH_2)_2CO_2^-$ | $2K^+$ |

Exemplified Compound II-1

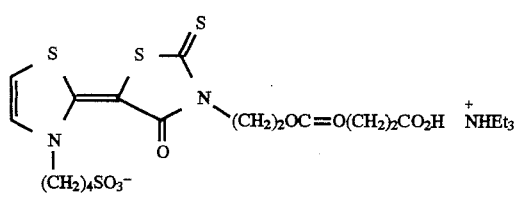

Exemplified Compound II-4

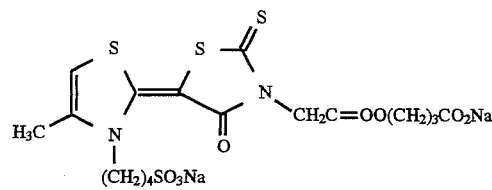

Exemplified Compound II-2

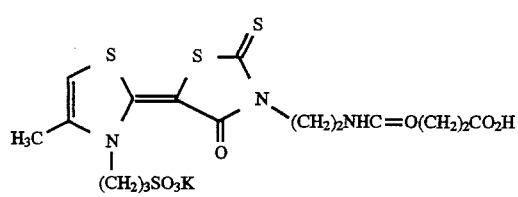

Exemplified Compound II-5

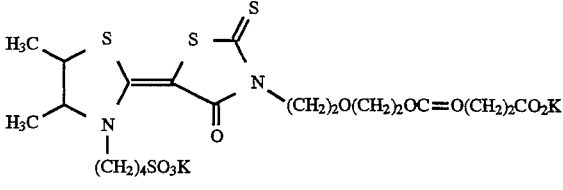

Exemplified Compound II-3

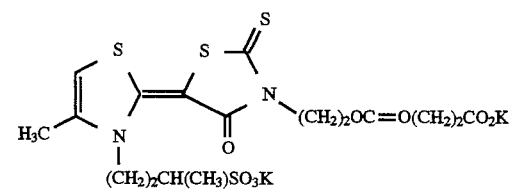

Exemplified Compound III-1

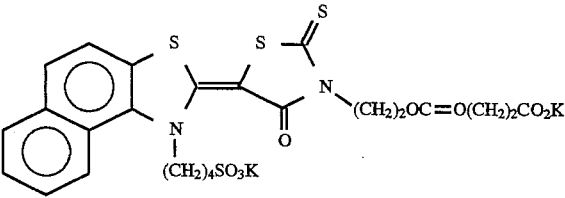

Exemplified Compound III-2

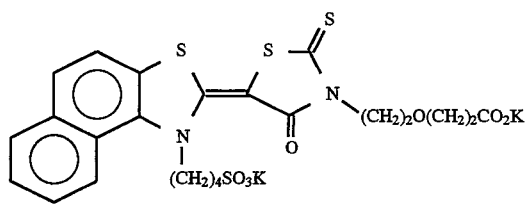

Exemplified Compound III-3

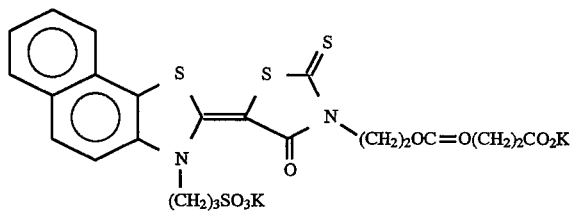

Exemplified Compound III-4

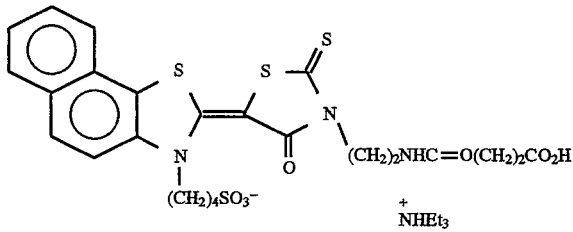

Exemplified Compound IV-I

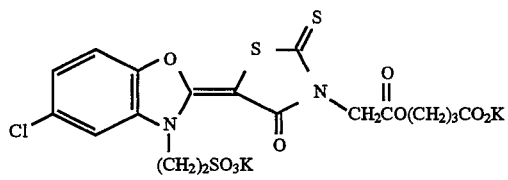

Exemplified Compound IV-II

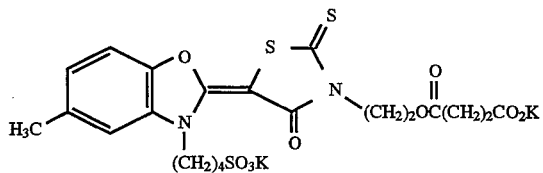

Exemplified Compound IV-III

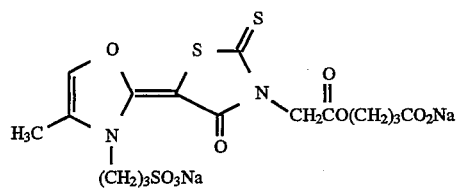

Exemplified Compound IV-IV

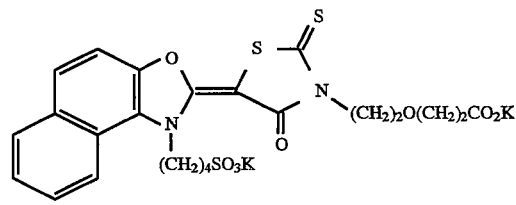

Exemplified Compound IV-V

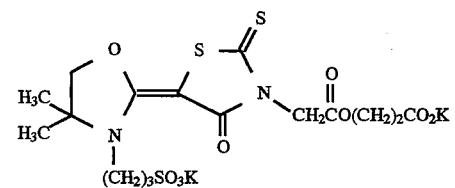

Exemplified Compound V-I

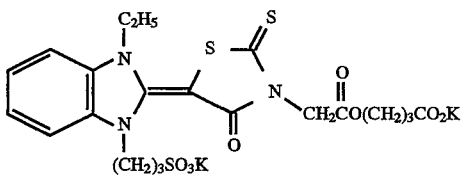

Exemplified Compound V-II

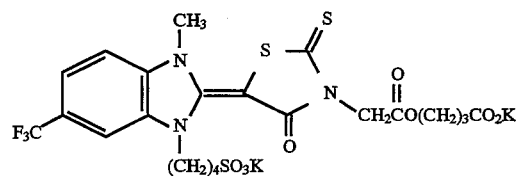

Exemplified Compound V-III

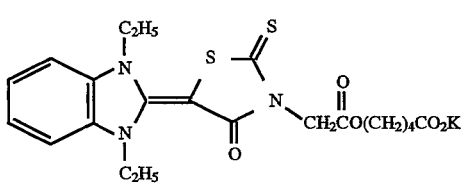

The methine compound represented by general formula (I) in the present invention can be easily synthesized by persons skilled in the art by reference to merocyanine compound synthesis examples given in F. M. Harmer, *Heterocyclic Compounds—Cyanine Dyes and Related Compounds*-, John Wiley & Sons, New York, London, (1964); D. M. Starmer, *Heterocyclic Compounds—Special Topics in Heterocyclic Chemistry*-, pp. 482–515, John Wiley & Sons, New York, London, (1977); and references cited therein.

The substituent represented by $R_2$ in the present invention may be formed at any stage in the synthesis of the methine compound represented by general formula (I), and any known synthesis method may be used therefor. For example, for forming a substituent containing an ester bond therein, use may be made, for example, of a synthesis method in which an alcohol is reacted with an acid anhydride, a synthesis method in which an alcohol is reacted with an acid halide, the mixed acid anhydride method, or a synthesis method in which an alcohol is reacted with a carboxylic acid in the presence of a condensation agent. Examples of condensation agents usable for the reaction include dicyclohexylcarbodiimide, carbonyldiimidazole, N,N'-disuccinimidyl carbonate, and 1-ethyl-3-(3'-dimethylaminopropyl)carbodiimide. For forming a substituent containing an amide bond therein, use may be made, for example, of a synthesis method in which a carboxylic acid is reacted with an amine in the presence of a condensation agent, or a synthesis method in which an acid halide is reacted with an amine. The carboxyl group contained in a substituent can be synthesized from an alcohol or an aldehyde through an oxidation reaction.

Synthesis Examples for compounds according to the present invention are given below, but methods for synthesizing the methine compound of the present invention should not be construed as being limited thereto. Other compounds represented by general formula (I) can be synthesized according to the following synthesis methods.

Synthesis of Exemplified Compound I-1:

Into a 100-ml flask were placed 1 g of triethylammonium 4-[2-[3-(2-hydroxyethyl)rhodanin-5-ylidene]-5-methoxy-3-benzothiazolyl]butanesulfonate, 50 ml of acetonitrile, 5 ml of pyridine, 400 mg of succinic anhydride, and 400 mg of triethylamine. The contents were heated with refluxing for 1 hour. After the solvent was distilled off under reduced pressure, the residue was dissolved in 10 ml of ethanol, and 30 ml of isopropyl alcohol was added thereto. The crystals precipitated were taken out by filtration, washed with ethanol, and then purified by recrystallization from methanol. Thus, 840 mg of Exemplified Compound I-1 was obtained.

$\lambda$max (MeOH)=433 nm, $\epsilon$=6.27×10$^4$

Synthesis of Exemplified Compound I-2:

Into a 100-ml flask were placed 3.7 g of triethylammonium 3-[2-[3-(2-hydroxyethyl)rhodanin-5-ylidene]-3-benzothiazolyl]propanesulfonate, 140 ml of acetonitrile, 10 ml of triethylamine, and 3 g of succinic anhydride. The contents were heated with refluxing for 3 hours. After the solvent was distilled off under reduced pressure, the residue was purified by recrystallization from methanol. Thus, 3.7 g of Exemplified Compound I-2 was obtained.

$\lambda$max (MeOH)=429 nm, $\epsilon$=6.19×10$^4$

Synthesis of Exemplified Compound I-3:

Into a 100-ml flask were placed 1.4 g of triethylammonium 3-[2-[3-(2-hydroxyethyl)rhodanin-5-ylidene]-5-methoxy-3-benzothiazolyl]-1-methylpropanesulfonate, 20 ml of pyridine, 343 mg of succinic anhydride, and 2 ml of triethylamine. The contents were stirred at 80° C. for 3 hours. After the solvent was distilled off under reduced pressure, the residue was dissolved in 100 ml of ethanol, and a solution of 1 g of potassium acetate in 30 ml of ethanol was added thereto. The crystals precipitated were taken out by filtration, washed with ethanol, and then purified by recrystallization from a methanol/acetonitrile mixed solvent. Thus, 1.3 g of Exemplified Compound I-3 was obtained.

$\lambda$max (MeOH)=434 nm, $\epsilon$=5.39×10$^4$

Synthesis of Exemplified Compound I-7:

Into a 100-ml flask were placed 1 g of triethylammonium 4-[2-[3-(2-hydroxyethyl)rhodanin-5-ylidene]-5-methoxy-3-benzothiazolyl]butanesulfonate, 20 ml of pyridine, 1 g of diglycollic anhydride, and 2 ml of triethylamine. The contents were heated at 50° C. for 8 hours. After the solvent was distilled off under reduced pressure, the residue was dissolved in 100 ml of ethanol, and a solution of 1 g of potassium acetate in 50 ml of ethanol was added thereto. The crystals precipitated were taken out by filtration, washed with ethanol, and then purified by recrystallization from a methanol/acetonitrile mixed solvent. Thus, 1.05 g of Exemplified Compound I-7 was obtained.

$\lambda$max (MeOH)=435 nm, $\epsilon$=5.88×10$^4$

Synthesis of Exemplified Compound I-9:

Into a 300-ml flask were placed 1.5 g of disodium [5-[5-methoxy-3-(4-sulfobutyl)benzothiazol-2-ylidene]rhodanin-3-yl]acetate, 910 mg of carbonyldiimidazole, and 50 ml of dimethylformamide. The contents were stirred at room temperature for 3 hours, upon which yellow crystals precipitated. A solution of 530 mg of sodium 3-hydroxybutyrate in 100 ml of dimethylformamide was added thereto dropwise, and the resulting mixture was stirred at 80° C. for 4 hours. After the solvent was distilled off under reduced pressure, the residue was dissolved in 50 ml of ethanol, and a solution of 1 g of sodium acetate in 100 ml of ethanol was added thereto. The crystals precipitated were taken out by filtration, washed with ethanol, and then purified by recrystallization from a methanol/acetonitrile mixed solvent. Thus, 1.47 g of Exemplified Compound I-9 was obtained.

$\lambda$max (MeOH)=429 nm, $\epsilon$=5.93×10$^4$

Synthesis of Exemplified Compound I-10:

Into a 300-ml flask were placed 1.8 g of bis(triethylammonium) [5-[5-methoxy-3-(3-sulfopropyl)benzothiazol-2-ylidene]rhodanin-3-yl]acetate, 910 mg of carbonyldiimidazole, and 40 ml of dimethylformamide. The contents were stirred at room temperature for 2 hours and 30 minutes, upon which yellow crystals precipitated. A solution of 530 mg of sodium 3-hydroxybutyrate in 100 ml of dimethylformamide was added thereto dropwise, and the resulting mixture was stirred at 80° C. for 4 hours. After the solvent was distilled off under reduced pressure, the residue was dissolved in 50 ml of ethanol, and a solution of 1 g of potassium acetate in 50 ml of ethanol was added thereto. The crystals precipitated were taken out by filtration, washed with ethanol, and then purified by recrystallization from a methanol/acetonitrile mixed solvent. Thus, 1.65 g of Exemplified Compound I-10 was obtained.

λmax (MeOH)=431 nm, ε=5.88×10⁴

Synthesis of Exemplified Compound I-11:

Into a 100-ml flask were placed 1.2 g of triethylammonium [5-[5-methoxy-3-(4-sulfobutyl)benzothiazol-2-ylidene]rhodanin-3-yl]acetate, 1.5 g of carbonyldisuccinimidyl, and 40 ml of dimethylformamide. The contents were stirred at room temperature for 6 hours. One gram of lactic acid and 210 mg of triethylamine were added thereto, and the resulting mixture was stirred at 50° C. for 2 hours. After the solvent was distilled off under reduced pressure, the residue was dissolved in 100 ml of ethanol, and a solution of 1 g of potassium acetate in 50 ml of ethanol was added thereto. The crystals precipitated were taken out by filtration, washed with ethanol, and then purified by recrystallization from a methanol/acetonitrile mixed solvent. Thus, 1.03 g of Exemplified Compound I-11 was obtained.

λmax (MeOH)=433 nm, ε=6.13×10⁴

Synthesis of Exemplified Compound I-12:

Into a 100-ml flask were placed 1 g of triethylammonium 4-[2-[3-(2-hydroxyethyl)rhodanin-5-ylidene]-5-methoxy-3-benzothiazolyl]butanesulfonate, 20 ml of dimethylformamide, 1 g of maleic anhydride, and 1 ml of triethylamine. The contents were stirred at room temperature for 7 hours. After the solvent was distilled off under reduced pressure, the residue was dissolved in 100 ml of ethanol, and a solution of 1 g of potassium acetate in 50 ml of ethanol was added thereto. The crystals precipitated were taken out by filtration, washed with ethanol, and then purified by recrystallization from a methanol/acetonitrile mixed solvent. Thus, 920 mg of Exemplified Compound I-12 was obtained.

λmax (MeOH)=434 nm, ε=6.03×10⁴

Synthesis of Exemplified Compound I-14:

Into a 100-ml flask were placed 1 g of triethylammonium 4-[2-[3-[2-(2-hydroxyethoxy)ethyl]rhodanin-5-ylidene]-5-methoxy-3-benzothiazolyl]butanesulfonate, 20 ml of pyridine, 400 mg of succinic anhydride, and 2 ml of triethylamine. The contents were stirred at room temperature for 2 hours and 30 minutes. After the solvent was distilled off under reduced pressure, the residue was dissolved in 50 ml of methanol, and a solution of 1 g of potassium acetate in 50 ml of ethanol was added thereto. The crystals precipitated were taken out by filtration, washed with ethanol, and then purified by recrystallization from a methanol/acetonitrile mixed solvent. Thus, 540 mg of Exemplified Compound I-14 was obtained.

λmax (MeOH)=434 nm, ε=5.74×10⁴

Synthesis of Exemplified Compound I-15:

Into a 100-ml flask were placed 960 mg of triethylammonium 3-[2-[3-[2-(2-hydroxyethoxy)ethyl]rhodanin-5-ylidene]-5-methoxy-3-benzothiazolyl]-1-methylpropopanesulfonate, 20 ml of pyridine, 400 mg of succinic anhydride, and 2 ml of triethylamine. The contents were stirred at 80° C. for 2 hours and 30 minutes. After the solvent was distilled off under reduced pressure, the residue was dissolved in 50 ml of methanol, and a solution of 1 g of potassium acetate in 50 mi of ethanol was added thereto. The crystals precipitated were taken out by filtration, washed with ethanol, and then purified by recrystallization from a methanol/acetonitrile mixed solvent. Thus, 890 mg of Exemplified Compound I-15 was obtained.

λmax (MeOH)=434 nm, ε=5.56×10⁴

Synthesis of Exemplified Compound I-18:

Into a 500-ml flask were placed 13.2 g of glycylglycine, 200 ml of methanol, 20 g of triethylamine, and 15 g of carbon disulfide. The contents were stirred at 30° C. for 1 hour. A solution of 12.3 g of ethyl chloroacetate in 50 ml of methanol was added thereto dropwise, and this mixture was stirred at room temperature for 30 minutes. The resulting solution assumed a yellowish orange color. After the solvent was distilled off under reduced pressure, 50 ml of ethanol was added to the residue, and a solution of 15 g of potassium acetate in 300 ml of ethanol was added thereto. The crystals precipitated were taken out by filtration and washed with ethanol to obtain 15.4 g of rhodanin-3-ylmethylcarbamoylacetic acid.

Into a 200-ml flask were placed 2.35 g of 5-methoxy-3-[(4-sulfobutyl)thio]benzothiazolinio-3-(butanesulfonate), 1.43 g of rhodanin-3-ylmethylcarbamoylacetic acid, 30 ml of methanol, 2 g of triethylamine, and 30 ml of acetonitrile. The contents were stirred at room temperature for 1 hour. A solution of 2.2 g of potassium acetate in 100 ml of methanol was added thereto, and the resulting mixture was stirred for further 1 hour. The crystals precipitated were taken out by filtration and then purified by washing with hot methanol. Thus, 2.87 g of Exemplified Compound I-18 was obtained.

λmax (MeOH)=432 nm, ε=6.38×10⁴

The novel methine compounds represented by general formula (I) of the present invention are effective as dyes for optical filters. Ground pulp and bleached sulfite pulp dye with these compounds, which remain adherent thereto virtually completely. These compounds are effective also as dyes and spectral sensitizing dyes for photographic photosensitive materials. Furthermore, these compounds have a high energy conversion efficiency and are also useful as high-performance laser dyes having good fastness. In addition, these compounds can be utilized not only for cell staining for the purpose of living body investigations or of disease diagnoses, but also as a medicine or agricultural chemical for the control of a living body function.

Use examples for compounds according to the present invention are described below in more detail by reference to Examples, but applications of the compounds of the present invention should not be construed as being limited thereto.

EXAMPLE 1

In 930 ml of warm water was dissolved 70 g of gelatin. The temperature of this gelatin solution was kept at 40° C. To this solution was added Exemplified Compound I-1 as a dye for optical filter in such an amount as to result in a dye concentration of $1\times10^{-4}$M. This solution was applied to a poly(ethylene terephthalate) film in an amount of 30 g/m² in terms of gelatin amount. This optical filter was examined for absorption spectrum with spectrophotometer U-3500, manufactured by Hitachi Ltd., Japan. As a result, the filter had a maximum-absorption wavelength of 440 nm. This optical filter was stored at 50° C. for 5 days and then examined for any change in absorption intensity. As a result, no decrease in absorption was observed.

EXAMPLE 2

Exemplified Compound I-14 and Comparative Compound C-1 were separately dissolved in water each in such an amount as to result in a concentration of $2 \times 10^{-3}$M. Colorless cotton cloths each 5 cm square were immersed in these solutions and then air-dried. The dyed cloths were immersed in 20° C. water. As a result, the cloth dyed with Exemplified Compound I-14 suffered little dye dissolution therefrom, whereas in the cloth dyed with Comparative Compound C-1, most of the dye dissolved away.

Comparative Compound C-1

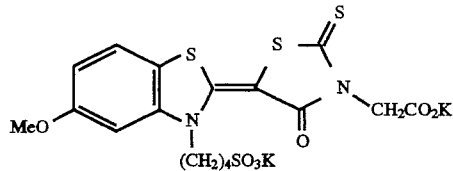

The novel methine compound according to the present invention has excellent stability and high dyeing power.

While the invention has been described in detail and with reference to specific embodiments thereof, it will be apparent to one skilled in the art that various changes and modifications can be made therein without departing from the spirit and scope thereof.

What is claimed is:

1. A methine compound represented by general formula (I):

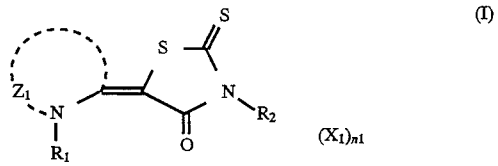

wherein $Z_1$ represents a group of nonmetal atoms necessary for completing a five- or six-membered nitrogen-containing heterocycle; $R_1$ represents an unsubstituted or substituted alkyl group; $R_2$ represents a linear or branched alkyl, alkenyl, or alkynyl group containing at least one carboxyl group and at least one ester bond, amide bond, or ether bond; $X_1$ represents a counter ion necessary for charge neutralization; and $n_1$ represents a number of 0 or larger necessary for intramolecular charge neutralization.

2. The methine compound as claimed in claim 1, wherein $Z_1$ represents a group of nonmetal atoms necessary for completing an optionally substituted thiazole, benzothiazole, or naphthothiazole ring.

3. The methine compound as claimed in claim 1, wherein $Z_1$ represents a group of nonmetal atoms necessary for completing an optionally substituted benzothiazole ring.

* * * * *